(12) United States Patent  
Smith

(10) Patent No.: US 6,325,004 B1  
(45) Date of Patent: Dec. 4, 2001

(54) DIVERTER FOR USE WITH A DOUBLE SHOOT AIR SEEDING SYSTEM

(76) Inventor: Boyd Stanley Smith, 37 Allsop Drive, Red Deer, Alberta (CA), T4R 2V2

( * ) Notice: Subject to any disclaimer, the term of this patent is extended or adjusted under 35 U.S.C. 154(b) by 0 days.

(21) Appl. No.: 09/842,116

(22) Filed: Apr. 26, 2001

(30) Foreign Application Priority Data

May 4, 2000 (CA) .................................................. 2307516

(51) Int. Cl.⁷ .................................................. B65G 11/00
(52) U.S. Cl. .................................................. 111/174
(58) Field of Search .................................... 111/174, 175; 222/630, 290

(56) References Cited

U.S. PATENT DOCUMENTS

| | | | |
|---|---|---|---|
| 4,276,836 | 7/1981 | Pust | 111/86 |
| 4,603,645 | 8/1986 | Wiemeyer | 111/1 |
| 4,779,765 | 10/1988 | Neumeyer | 222/142 |

FOREIGN PATENT DOCUMENTS

| | | |
|---|---|---|
| 1297735 | 3/1992 | (CA) . |
| 2219230 | 10/1997 | (CA) . |

*Primary Examiner*—Christopher J. Novosad  
(74) *Attorney, Agent, or Firm*—Ryan W. Dupuis; Adrian D. Battison; Michael R. Williams

(57) ABSTRACT

A diverter is provided for use on an air seeder having fertilizer and seed conduits for conducting respective particulate material fertilizer and seed therethrough. The diverter includes a pair of tubes and coupling means for mounting the tubes in series with the respective fertilizer and seed conduits. A diverter tube is coupled between the pair of tubes for diverting a portion of the fertilizer from the fertilizer conduit into the seed conduit. A starter fertilizer is thus deposited with the seed while a remaining portion of the fertilizer is deposited spaced therefrom. The diverter can be installed in the conduits of an existing air seeder with minimal cost or tooling requirements.

20 Claims, 2 Drawing Sheets

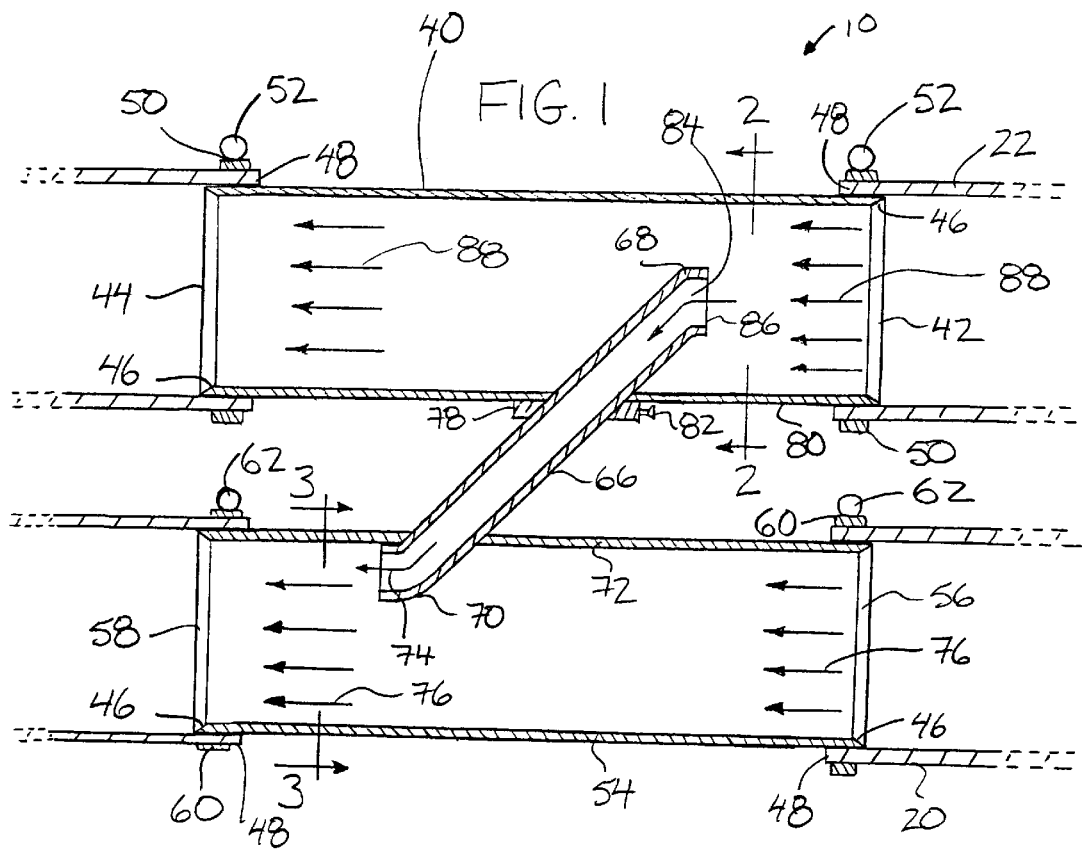
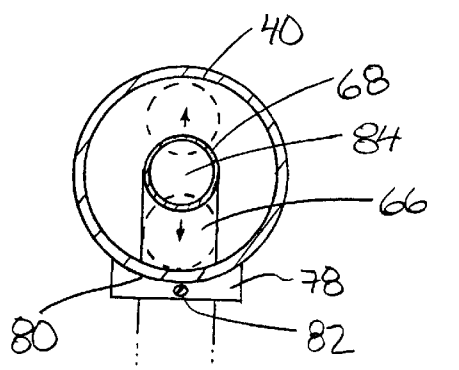
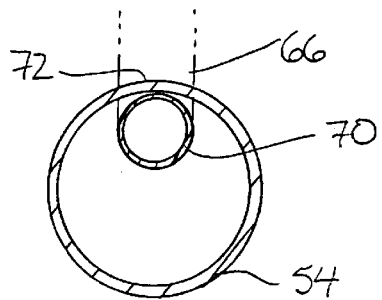

DIVERTER FOR USE WITH A DOUBLE SHOOT AIR SEEDING SYSTEM

FIELD OF THE INVENTION

This invention relates to a diverter for use in a double shoot air seeding system having first and second particulate material conduits wherein the diverter is arranged to divert a portion of the particulate material from the first conduit into the second conduit.

BACKGROUND

It is a known agricultural practice to make use of a double shoot air seeder when seeding a field for depositing both fertilizer and seed into the ground in a single pass over the ground. A double shoot air seeder generally comprises a fertilizer conduit and a seed conduit for conducting fertilizer and seed from respective fertilizer and seed hoppers on the seeder to a plurality of furrowing elements. The furrowing elements are arranged to deposit the seed and fertilizer into the ground at spaced apart locations. This is desirable so as not to provide too much fertilizer to the seed in the early stages of seed growth. It is however desirable to deposit a small amount of starter fertilizer with the seed to assist in the early stages of growth without burning the seed. This is accomplished when using a triple shoot air seeder which is arranged to deposit a small amount of fertilizer with the seed and a further amount of fertilizer spaced from the seed. The replacement of a double shoot air seeder with a triple shoot seeder however is very costly and preferably avoidable.

Canadian Patent No. 1,297,735 to Neumeyer provides a fertilizer divider for dual air seeder systems. The divider comprises an adjustable divider plate which is coupled to the fertilizer metering system such that adjustment of the plate will redirect a portion of the fertilizer into the seed tube in a double shoot air seeder. The divider however includes a complex arrangement of parts which requires tedious installation directly adjacent the metering system as well as some replacement of parts of the seeder. Furthermore, the metering system requires separate adjustment of the amount of fertilizer being deposited into the seed tube and the amount of fertilizer being deposited into the fertilizer tube. This is inconvenient when it is desirable to increase the overall flow rate of both the seed and fertilizer while preserving a constant ratio of fertilizer which is to be diverted into the seed tube.

SUMMARY

According to one aspect of the present invention there is provided a device for use with an air seeder having first and second conduits for conducting respective first and second particulate materials therethrough, the device comprising:

a first tube having an inlet and an outlet for communication with the first conduit;

a second tube having an inlet and an outlet for communication with the second conduit;

coupling means for coupling the first and second tubes in series with the first and second conduits respectively to communicate the first and second particulate materials respectively therethrough; and a diverter tube coupled at a first end on the first tube to extend outward therefrom to a second end coupled on the second tube, the diverter tube having a mouth projecting into the first tube for receiving a portion of the first particulate material from the first conduit such that the portion of the first particulate material is diverted through the diverter tube and into the second tube.

The device of the present invention can be installed on a double shoot air seeder having fertilizer and seed conduits to divert a portion of the fertilizer from the fertilizer conduit into the seed conduit. The portion of fertilizer is thus deposited with the seed to act as starter fertilizer while the remaining fertilizer is deposited by the fertilizer conduit in the ground at a location spaced from the seed. The diverter of the present invention thus allows simple conversion of a double shoot air seeder to act as triple shoot air seeder at minimal cost and with minimal effort of installation.

The first end of the diverter tube is preferably mounted to project through a side wall of the first tube wherein the mouth comprises an opening in the first end of the diverter tube which at least partially faces the inlet of the first tube. The diverter tube is thus located directly within the flow of particulate material through the first tube to effectively collect a portion of the particulate material flowing therethrough.

The diverter tube is preferably circular in cross section. The tube projecting into the first tube thus provides less of an obstruction to the particulate material which is not collected and flows around the tube.

The first end of the diverter tube is preferably oriented to extend substantially parallel to a longitudinal axis of the first tube. The flow of particulate material at the mouth of the diverter tube is thus not restricted or redirected until the particulate material has already passed through the mouth. The opening is preferably oriented such that a plane locating the opening therein is substantially perpendicular to a longitudinal axis of the first tube to further reduce restriction of flow into the diverter tube.

The diverter tube may extend outwardly from the first tube at an incline towards the outlet of the first tube. The diverter tube preferably extends from the first tube at an angle of approximately 45 degrees therefrom. The flow of particulate material through the diverter tube is thus minimally redirected at each end thereof.

Preferably a diameter of the diverter tube is approximately one third of the diameter of the first and second tubes respectively. The resulting ratio of fertilizer diverted provides a useful amount of starter fertilizer.

The diverter preferably includes an end portion which projects into the second tube, the end portion being oriented to extend substantially parallel to a longitudinal axis of the second tube. The redirection of the particulate material into the second tube is thus gradually introduced into the flow of particulate material in the second tube.

There may be provided adjustable mounting means mounting the mouth within the first tube such that a location of the mouth within a cross sectional area of the first tube is adjustable. This allows the mouth to be located within the flow of particulate material through the first tube regardless of the orientation of the first tube.

The adjustable mounting means preferably comprises a collar mounted on an outer wall of the first tube, the collar receiving the diverter tube therethrough and having fastening means for selectively securing the diverter tube on the collar at one of various longitudinal positions of the diverter tube within the collar.

According to a further aspect of the present invention there is provided a diverter in combination with an air seeder having first and second hoppers for storing respective first and second particulate materials therein and first and second conduits coupled to the first and second hoppers respectively for conducting the first and second particulate materials respectively therethrough to be deposited on the ground, the diverter comprising:

a first tube having an inlet and an outlet for communication with the first conduit;

a second tube having an inlet and an outlet for communication with the second conduit;

coupling means coupling the first and second tubes in series with the first and second conduits respectively to communicate the first and second particulate materials respectively therethrough; and a diverter tube coupled at a first end on the first tube to extend outward therefrom to a second end coupled on the second tube, the diverter tube having a mouth projecting into the first tube for receiving a portion of the first particulate material from the first conduit such that the portion of the first particulate material is diverted through the diverter tube and into the second tube.

The first and second conduits preferably each comprise a primary portion connected to the corresponding hopper, a plurality of secondary portions associated with each primary portion and connecting a plurality of respective secondary distributors to the primary portion associated therewith, and a plurality of tertiary portions associated with each secondary distributor and being connected to a plurality of respective shanks.

Preferably the first and second tubes are coupled in series to the primary portions of the first and second conduits respectively, the first and second tubes having the diverter tube coupled therebetween.

Alternatively there may be provided a pair of the first and second tubes coupled in series to each pair of secondary portions of the first and second conduits respectively, each pair of the first and second tubes having the diverter tube coupled therebetween.

In a further arrangement, a pair of the first and second tubes may be coupled in series to each pair of tertiary portions of the first and second conduits respectively, each pair of the first and second tubes having the diverter tube coupled therebetween.

Preferably a diameter of the first and second tubes adjacent the respective inlets and outlets thereof is approximately equal to a diameter of the first and second conduits respectively. The inlet and outlets thus form a minimal shoulder along the inner surface of the conduits which has minimal effect on resisting the flow of particulate material therethrough.

The coupling means preferably comprises a plurality of adjustable collars arranged to be secured about an outer diameter of the respective first and second conduits for selectively restricting an end portion of the conduits about the respective inlets and outlets of the first and second tubes. The first and second tubes can thus be installed in line with the respective conduits of an existing double shoot air seeder with convention tools.

BRIEF DESCRIPTION OF THE DRAWINGS

In the accompanying drawings, which illustrate an exemplary embodiment of the present invention:

FIG. 1 is a sectional side elevational view of the diverter according to the present invention as shown installed within respective seed and fertilizer conduits of an air seeder.

FIG. 2 is a sectional view along the line 2—2 of FIG. 1.

FIG. 3 is a sectional view along the line 3—3 of FIG. 1.

DETAILED DESCRIPTION

Figure 4:
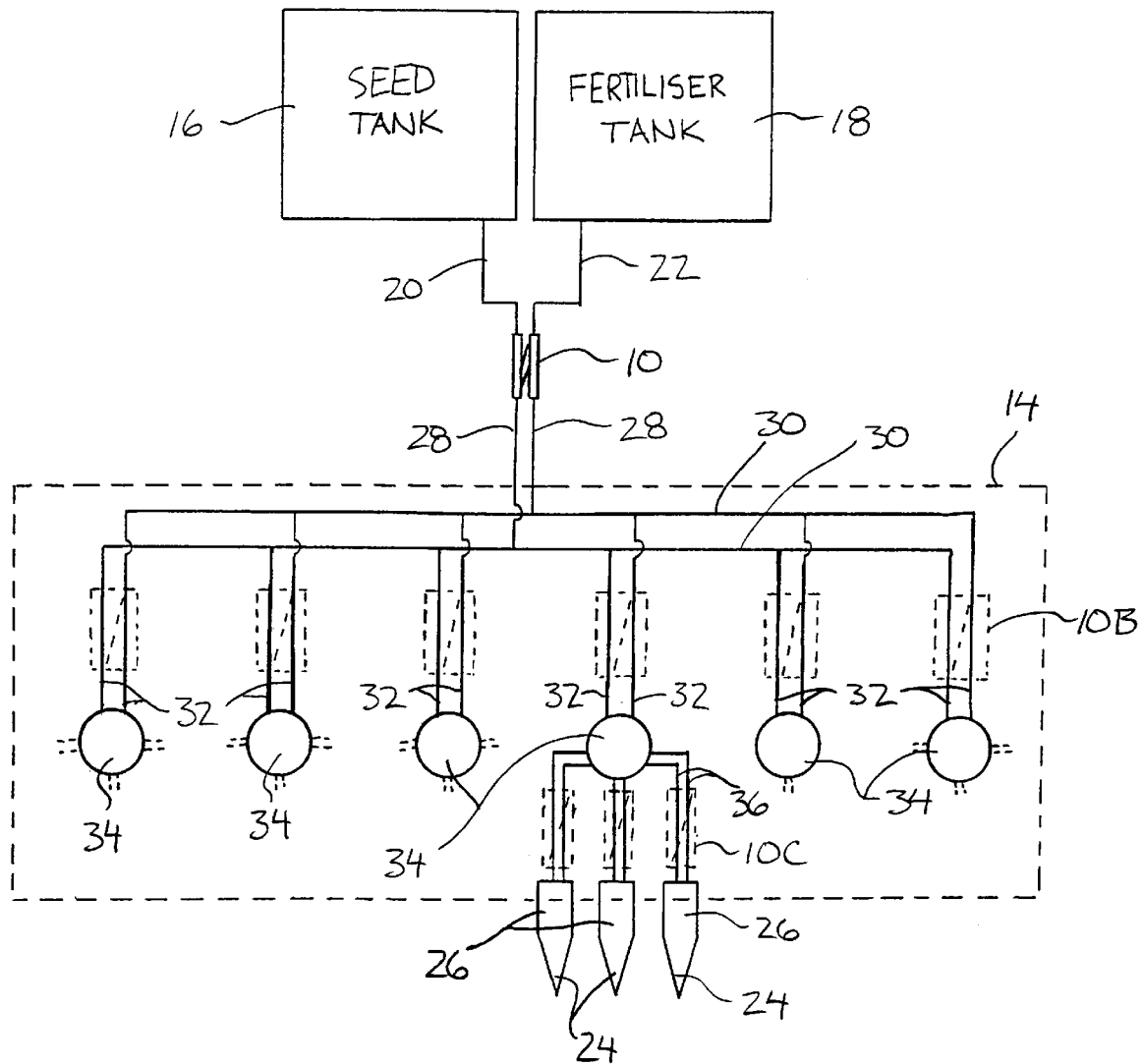
FIG. 4 is a schematic of a double shoot air seeder showing the location of the diverter according to the present invention installed thereon.

Referring to the accompanying drawings, there is illustrated a diverting device generally indicated by reference numeral 10. The device is for use with a double shoot air seeder 12 as shown in FIG. 4 for diverting a portion of the fertilizer to be mixed with the seed before the seed is deposited in the ground.

The air seeder 12 includes a frame 14 which is supported for rolling movement across the ground. A seed hopper 16 and a fertilizer hopper 18 are mounted on the air seeder 12 for storing particulate material in the form of seed and fertilizer respectively therein. The air seeder includes a seed conduit 20 and a fertilizer conduit 22 for directing the respective seed and fertilizer to a plurality of furrowing elements 24 mounted on respective shanks 26 on the seeder frame.

Each of the seed conduit and fertilizer conduit includes a primary portion 28 which directs the particulate material therein to a corresponding manifold 30 where the particulate material is subsequently directed into a plurality of secondary portions 32. Each secondary portion 32 is fed into a secondary distributor 34 for evenly distributing the particulate material into a plurality of tertiary portions 36 coupled thereto. The tertiary portions direct the particulate material to the respective furrowing elements 24. In the preferred embodiment, the device 10 is installed on the primary portions of the seed and fertilizer conduits as shown in FIG. 4.

The device 10 generally includes a fertilizer tube 40 having an inlet 42 and an outlet 44 for communication in series with the fertilizer conduit 22 so as to direct the fertilizer therethrough. The fertilizer tube 40 is a tubular member having a longitudinal axis and a diameter which corresponds to conventional fertilizer conduit sizes. Both the inlet and outlet include a taper 46 having a diameter which is substantially equal to an inner diameter of the fertilizer conduit so as to provide a minimal shoulder of minimal restriction to the flow of fertilizer therethrough when installed in the fertilizer conduit.

In order to mount the fertilizer tube within the fertilizer conduit a portion of the conduit is cut apart so that the fertilizer tube may be inserted therebetween with the respective ends 48 of the conduit overlapping the respective inlet and outlet of the fertilizer tube. An adjustable collar 50 is secured about an outer diameter of the fertilizer conduit at a position corresponding to each end of the fertilizer tube 40 so as to secure the fertilizer conduit thereon. A clamp member 52 located on the adjustable collar 50 allows the collar to be tightened about the fertilizer conduit for securing the fertilizer tube 40 therein.

A seed tube 54 is further provided similar to the fertilizer tube 40. The seed tube 54 is a tubular member having a longitudinal axis extending between an inlet 56 and an outlet 58 of the seed tube. The seed tube 54 is similarly dimensioned to the fertilizer tube 40 so as to be similarly mounted in series with the seed conduit 20 by respective adjustable collars 60 and respective clamp members 62.

A diverter tube 66 is coupled between the fertilizer tube and the seed tube so as to mount the tubes in a parallel arrangement as shown in FIG. 1. The diverter tube is a tubular member of circular cross section being approximately 1/3 in diameter of that of the fertilizer and seed tubes respectively. The diverter tube 66 is mounted at a fertilizer end 68 adjacent the inlet 42 of the fertilizer tube to extend outwardly from the tube towards the seed tube wherein the diverter tube 66 is mounted at a seed end 70 adjacent the outlet 58 of the seed tube. The diverter tube extends outwardly from the fertilizer tube 40 at an incline towards the outlet 44. The longitudinal axis of the diverter tube 66 preferably extends at an angle of approximately 45 degrees to the longitudinal axis of both the fertilizer and seed tubes.

The seed end 70 of the diverter tube 66 projects into the seed tube so as to be located adjacent an inner wall 72 of the seed tube nearest to the fertilizer tube 40. The seed end of the diverter tube is curved such that an outlet of the diverter tube defines an opening located in a plane which lies substantially perpendicular to a longitudinal axis of the seed tube such that a diverted fertilizer flow indicated by arrow 74 emerges from the diverter tube substantially parallel to a seed flow indicated by arrows 76 extending longitudinally through the seed tube. The seed end 70 of the diverter tube thus lies substantially parallel to the longitudinal axis of the seed tube.

The fertilizer end 68 of the diverter tube is mounted for longitudinal sliding movement on a collar 78 which is mounted on an inner face 80 of the fertilizer tube 40. The collar 78 includes a set screw 82 mounted therein for selectively engaging the diverter tube to selectively secure the diverter tube within the collar at one of various longitudinal positions therein so as to adjust a position of the diverter tube within the fertilizer tube 40.

The fertilizer end 68 of the diverter tube projects into the fertilizer tube and includes a mouth 84 on a free end thereof. The mouth 84 is a curved end portion of the diverter tube which is oriented substantially parallel to the longitudinal axis of the fertilizer tube such that an opening 86 defined in the fertilizer end of the tube lies in a plane which is substantially perpendicular to the longitudinal axis of the fertilizer tube and faces the inlet 42. Adjusting the longitudinal position of the diverter tube within the collar 78 adjusts the position of the mouth 84 within the cross sectional area of the fertilizer tube so as to optimize the flow of fertilizer into the opening at the fertilizer end of the diverter tube. The fertilizer flow indicated by arrows 88 through the fertilizer tube 40 surrounds the mouth 84 of the diverter tube such that a portion of the flow 88 is diverted into the diverter tube.

The device 10 is a low cost and simple to manufacture solution to provide a small amount of starter fertilizer with the seed when using a double shoot air seeder 12. The device is mounted in series with the respective fertilizer and seed conduits in use such that the respective fertilizer and seed flows are directed through the fertilizer and seed tube respectively. The diverter tube diverts a portion of the fertilizer flow 88 into the seed flow 76 such that the diverted fertilizer flow forms a starter fertilizer mixed with the seed while the remaining portion of the fertilizer is deposited in the ground spaced from the seed in a conventional manner.

In use the mouth 84 of the diverter tube is preferably located centrally within the fertilizer tube so as to ensure a uniform flow therethrough. However it may be optimal to reposition the mouth of the diverter tube depending on the relative orientation of the fertilizer and seed tubes. In further arrangements as shown in dotted line in FIG. 4, it may be preferable to mount the device 10 within the pairs of secondary portions 32 of the conduits as indicated by the reference numeral 10B. Similarly the device 10 may be mounted within each pair of tertiary portions 36 of the conduits as indicated by reference numeral 10C. The device 10 will operate effectively in either location but is preferably mounted within the primary portions of the conduits so as to optimise the uniformity of the fertilizer and seed flows. The respective diameters of the fertilizer tube and seed tube may be of any diameter but is preferably substantially equal in diameter to the conventional sizes of conduits in which the device is to be mounted.

While one embodiment of the present invention has been described in the foregoing, it is to be understood that other embodiments are possible within the scope of the invention. The invention is to be considered limited solely by the scope of the appended claims.

What is claimed is:

1. A device for use with an air seeder having first and second conduits for conducting respective first and second particulate materials therethrough, the device comprising:
    a first tube having an inlet and an outlet for communication with the first conduit;
    a second tube having an inlet and an outlet for communication with the second conduit;
    coupling means for coupling the first and second tubes in series with the first and second conduits respectively to communicate the first and second particulate materials respectively therethrough; and
    a diverter tube coupled at a first end on the first tube to extend outward therefrom to a second end coupled on the second tube, the diverter tube having a mouth projecting into the first tube for receiving a portion of the first particulate material from the first conduit such that the portion of the first particulate material is diverted through the diverter tube and into the second tube.

2. The device according to claim 1 wherein the first end of the diverter tube is mounted to project through a side wall of the first tube, the mouth comprising an opening in the first end of the diverter tube which at least partially faces the inlet of the first tube.

3. The device according to claim 2 wherein the diverter tube is circular in cross section.

4. The device according to claim 2 wherein the first end of the diverter tube is oriented to extend substantially parallel to a longitudinal axis of the first tube.

5. The device according to claim 2 wherein the opening is oriented such that a plane locating the opening therein is substantially perpendicular to a longitudinal axis of the first tube.

6. The device according to claim 1 wherein the diverter tube extends outwardly from the first tube at an incline towards the outlet of the first tube.

7. The device according to claim 6 wherein the diverter tube extends from the first tube at an angle of approximately 45 degrees therefrom.

8. The device according to claim 1 wherein a diameter of the diverter tube is approximately one third of the diameter of the first and second tubes respectively.

9. The device according to claim 1 wherein the diverter includes an end portion which projects into the second tube, the end portion being oriented to extend substantially parallel to a longitudinal axis of the second tube.

10. The device according to claim 1 wherein there is provided adjustable mounting means mounting the mouth within the first tube such that a location of the mouth within a cross sectional area of the first tube is adjustable.

11. The device according to claim 10 wherein the adjustable mounting means comprises a collar mounted on an outer wall of the first tube, the collar receiving the diverter tube therethrough and having fastening means for selectively securing the diverter tube on the collar at one of various longitudinal positions of the diverter tube within the collar.

12. A diverter in combination with an air seeder having first and second hoppers for storing respective first and second particulate materials therein and first and second conduits coupled to the first and second hoppers respectively for conducting the first and second particulate materials respectively therethrough to be deposited on the ground, the diverter comprising:

a first tube having an inlet and an outlet for communication with the first conduit;

a second tube having an inlet and an outlet for communication with the second conduit;

coupling means coupling the first and second tubes in series with the first and second conduits respectively to communicate the first and second particulate materials respectively therethrough; and a diverter tube coupled at a first end on the first tube to extend outward therefrom to a second end coupled on the second tube, the diverter tube having a mouth projecting into the first tube for receiving a portion of the first particulate material from the first conduit such that the portion of the first particulate material is diverted through the diverter tube and into the second tube.

13. The combination according to claim 12 wherein the first and second conduits each comprise a primary portion connected to the corresponding hopper, a plurality of secondary portions associated with each primary portion and connecting a plurality of respective secondary distributors to the primary portions associated therewith, and a plurality of tertiary portions associated with each secondary distributor and being connected to a plurality of respective shanks.

14. The combination according to claim 13 wherein the first and second tubes are coupled in series to the primary portions of the first and second conduits respectively, the first and second tubes having the diverter tube coupled therebetween.

15. The combination according to claim 13 wherein there is provided a pair of the first and second tubes coupled in series to each pair of secondary portions of the first and second conduits respectively, each pair of the first and second tubes having the diverter tube coupled therebetween.

16. The combination according to claim 13 wherein there is provided a pair of the first and second tubes coupled in series to each pair of tertiary portions of the first and second conduits respectively, each pair of the first and second tubes having the diverter tube coupled therebetween.

17. The combination according to claim 12 wherein there is provided adjustable mounting means mounting the mouth within the first tube such that a location of the mouth within a cross sectional area of the first tube is adjustable.

18. The combination according to claim 17 wherein the adjustable mounting means comprises a collar mounted on an outer wall of the first tube, the collar receiving the diverter tube therethrough and having fastening means for selectively securing the diverter tube on the collar at one of various longitudinal positions of the diverter tube within the collar.

19. The combination according to claim 12 wherein a diameter of the first and second tubes adjacent the respective inlets and outlets thereof is approximately equal to a diameter of the first and second conduits respectively.

20. The combination according to claim 12 wherein the coupling means comprises a plurality of adjustable collars arranged to be secured about an outer diameter of the respective first and second conduits for selectively restricting an end portion of the conduits about the respective inlets and outlets of the first and second tubes.

* * * * *